(No Model.)
T. L. CARLEY.
SAW MILL DOG.
No. 254,458. Patented Mar. 7, 1882.
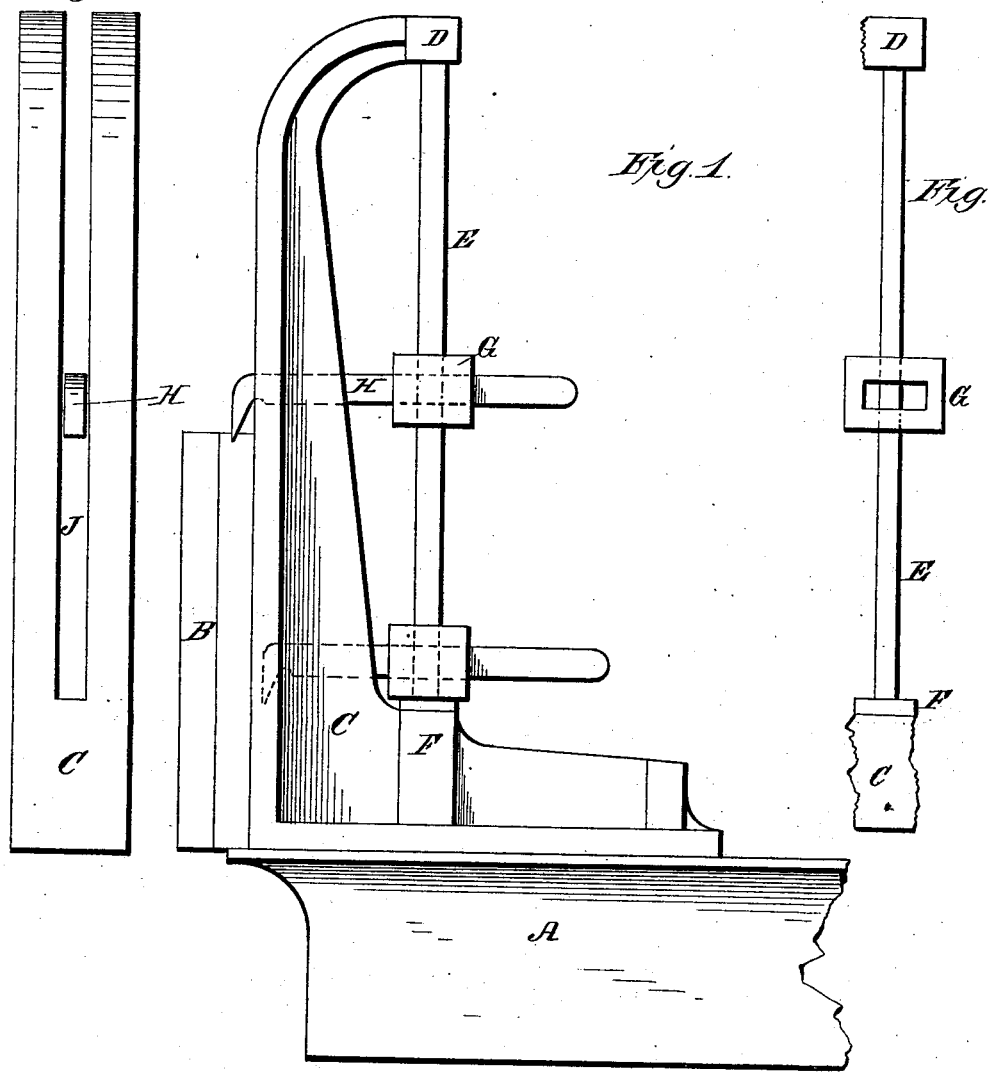
Witnesses.
Franck L. Ouraud,
S. G. Nottingham
Inventor.
Timothy L. Carley
by Suggett & Nottingham
Atty's.

UNITED STATES PATENT OFFICE.

TIMOTHY L. CARLEY, OF SYRACUSE, NEW YORK.

SAW-MILL DOG.

SPECIFICATION forming part of Letters Patent No. 254,458, dated March 7, 1882.

Application filed December 16, 1881. (No model.)

*To all whom it may concern:*

Be it known that I, TIMOTHY L. CARLEY, a citizen of the United States, residing at Syracuse, in the county of Onondaga and State of New York, have invented new and useful Improvements in Head-Blocks and Dogs for Saw-Mills, of which the following is a specification, reference being made to the drawings accompanying and forming a part of this specification.

The object of my invention is to furnish a head-block and board or plank dog so arranged and combined as to be more easily used and do better work, more quickly and advantageously, than those in ordinary use; and my improvement consists in the arrangement and combination of the mechanism hereinafter explained, and illustrated in said drawings, in which—

Figure 1 is a side view of part of the head-block and the mechanism in position. Fig. 2 is a side view of the stake of the head-block with slot in same, in which the dog is moved up and down. Fig. 3 is a view of the detachable standard for supporting the dog and sliding head. Fig. 4 is a top view of the dog, showing the mortise through which said standard passes. Fig. 5 is a top view of the sliding head, through which both said standard and said dog pass. The mortise in it shown is for the said standard.

In the several figures the same letters mean the same parts.

In said drawings, A represents the head-block, upon which the timber rests when being sawed. B represents a plank which is being sawed. C represents the knee of said head-block, which is curved at its top, and has an enlarged hub, (represented at D,) through which the standard E passes loosely into a hole or socket, (represented at F,) in the bottom of which there is a piece of rubber or other suitable material to prevent the metals striking each other. The said standard E can be made of a round or square piece of metal.

On E is a sliding head, (represented by G,) which easily slides up and down on the standard E, and raises or lowers the dog, (represented by H,) the latter working easily backward or forward horizontally in the said sliding head for the desired distance. This is done by having a mortise in H (shown by I in Fig. 4) made long enough to give the desired lateral play. The dog H passes through a slot (represented by J) in the knee C, and can easily play or slide up and down therein.

The operation of the mechanism is substantially as follows: The dog is placed in the head-block, and then the standard E is run through hub D and said sliding head and dog, the lower end resting in its socket F. The dog H engages the timber or plank to be sawed, as shown in Fig. 1, and then the sliding head drops a little and becomes eccentric with the standard, and consequently holds or locks the point of the dog firmly in its engagement with the plank, while the saw passes through and makes two boards. The object of the dog is to hold the last board or plank when it is being sawed. When not in use the dog has only to be drawn back and dropped down, when its point is in the slot J and is out of the way.

The standard E can be fastened rigidly in the hubs D and socket F by set-screws or keys. The standard E serves to strengthen the knee C and at the same time hold the dog in position and perform the other offices mentioned. Both the dog H and sliding head G can be clamped by means of set-screws or keys to the standard E, or to each other; but I usually find that the dog is securely held, as I have heretofore explained.

Having thus described my improvements, I claim and desire to secure by Letters Patent—

The combination of the knee C, having hub D and recess J, with the standard E, the hooked dog H, and sliding carriage G, as and for the purposes set forth.

In witness whereof I have signed this specification, at Syracuse, New York, this 9th day of December, A. D. 1881, in the presence of two witnesses.

TIMOTHY L. CARLEY.

Witnesses:
WM. D. DUNNING,
JOHN C. CLARKSON.